W. F. PENROD.
TRANSMITTING GEAR SYSTEM.
APPLICATION FILED NOV. 24, 1919.

1,384,482.  Patented July 12, 1921.

Inventor:
William Franklin Penrod
By Walter A. Knight
Attorney.

UNITED STATES PATENT OFFICE.

WILLIAM FRANKLIN PENROD, OF CINCINNATI, OHIO, ASSIGNOR TO ANTHONY J. WISSEL, TRUSTEE.

TRANSMITTING-GEAR SYSTEM.

1,384,482.           Specification of Letters Patent.      Patented July 12, 1921.

Application filed November 24, 1919. Serial No. 340,301.

*To all whom it may concern:*

Be it known that I, WILLIAM FRANKLIN PENROD, a citizen of the United States, residing at Cincinnati, in the county of Hamilton and State of Ohio, have invented new and useful Improvements in Transmitting-Gear Systems, of which the following is a specification.

My invention relates to transmitting gear-systems, such for example, as are used in power-driven vehicles, in which, by shifting the gears into varying relations different speeds are produced by the same driving power. My object is, primarily, to produce a simplified and improved system to the end of reducing the number of gears usually employed in changes of speed, and obtain a greater range of speeds with fewer elements and less engine power; and, by improvements with respect to individual features, to realize certain general advantages in the mode and effect of the application of power, reducing frictional resistances, etc., tending to greater efficiency and prolonged life of the system.

My invention is in the nature of a further development of the general plan and purpose forming the subject of my pending application for Letters Patent, Serial No. 308,431; embodying, as a central idea, a simultaneous drive of the axle shaft by engaging the ring gear at opposite sides simultaneously; and other improvements therein described.

My invention is illustrated in the accompanying drawings, in which—

Figure 1:
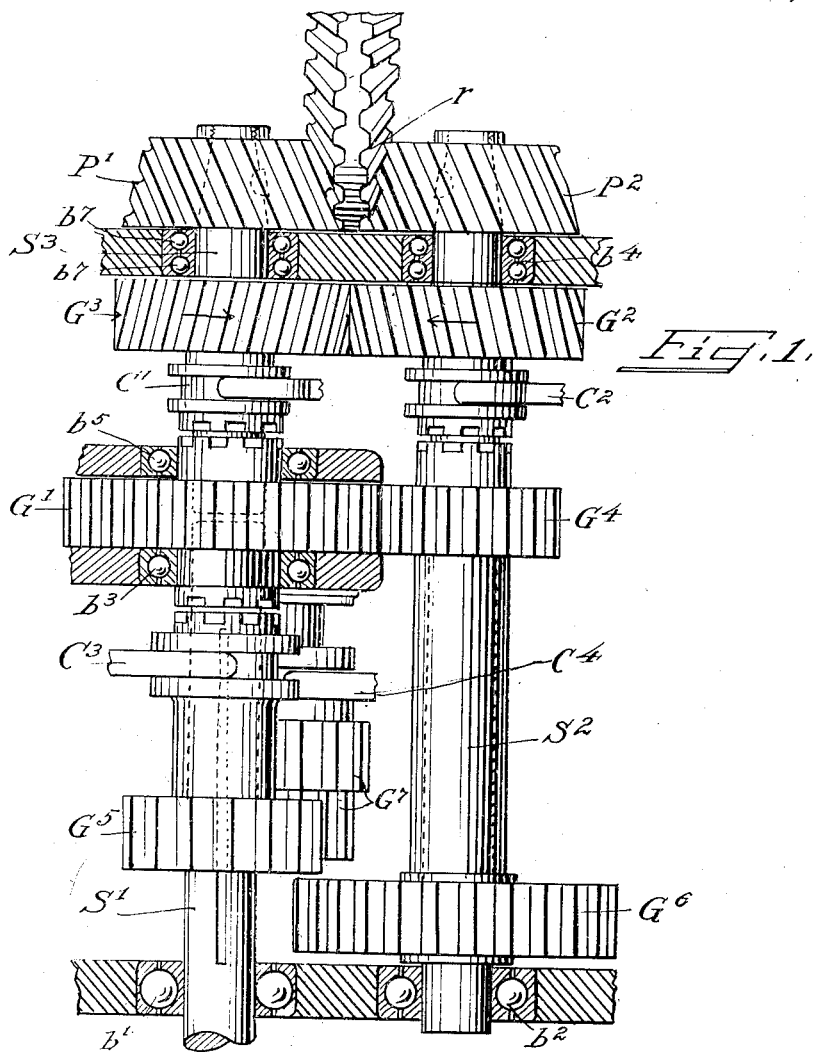
Figure 1 is a general plan view of the gear system with gears.
Figure 2:
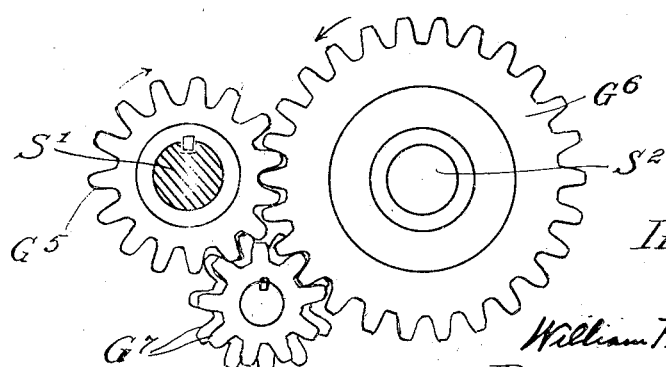
Fig. 2 is a horizontal cross sectional view explanatory of the reversing connection.

In the drawings herewith, the position of parts shown is that termed "neutral". The letters of reference indicative of parts are initial letters of the common name designating members of a class;— as "S" for shafts; "G" for gears; "P" for bevel-pinions; "C" for clutches; and "b" for bearings, etc.; all differentiated by consecutive numbering;— odd numbers, as 1, 3, 5, etc., indicating those upon or appertaining to the motor or main shaft; and even numbers, as 2, 4, etc., those in like relation with the auxiliary shaft. The bearings are indicated diagrammatically by small circles within inclosures, which stand for preferred "ball bearings".

Referring now to the drawings, "$S^1$" designates the main shaft, to which the driving power is initially applied; having a bearing "$b^1$" immediately forward of the tranmission gears toward the motor-end, while the rear end extends into and revolves within the axial perforation of a gear "$G^1$" as a journal bearing;— said gear "$G^1$" having hub-extensions at its sides carried in bearings, "$b^3$, $b^5$" adjacent to the body of the gear. In axially abutting relations with the shaft "$S^1$" within the central perforation of gear "$G^1$" is an independently rotative extension "$S^3$" of said main shaft, extending forward through a gear "$G^3$" affixed thereto, and through a rearwardly adjacent bearing, "$b^7$", and carrying fixedly at its end a bevel pinion "$P^1$".

A one-way clutch "$C^1$" is splined on the extension shaft "$S^3$", immediately rearward of the gear "$G^1$" with which it is engaged when desired, and forward of the gear "$G^1$" is a similar clutch "$C^3$" combined with a gear "$G^5$", and splined as one on the main shaft "$S^1$". The rearward movement of the combined clutch and gear "$C^3$"—"$G^5$", connects the gear "$G^1$" with the main shaft "$S^1$"; while its forward movement shifts the gear "$G^5$" into mesh with the gear "$G^6$", as explained later.

Parallel with the main shaft "$S^1$" and extension-shaft "$S^3$," is an auxiliary shaft "$S^2$" carried in bearings "$b^2$, $b^4$." At its rearward end it carries fixedly a bevel pinion "$P^2$"—a duplicate of pinion "$P^1$," and coincidently therewith but at the opposite side engaging and driving the ring-gear "$r$" of the rear axle as applied to an automobile. Forwardly thereof is a spur gear "$G^2$" engaging the equal a corresponding gear "$G^3$" of extension shaft "$S^3$." The pinions "$P^1$, $P^2$," as also the gears "$G^2$, $G^3$," are fixed permanently to their shafts the two former being always in mesh at opposite sides with the intervening ring gear and the two latter in mesh with each other.

There is thus constituted a drive-system in which power may be directly applied to the ring gear R, through either or both at the bevel pinions $p^1$, $p^2$.

The teeth of pinions "$p^1$, $p^2$" (and of the intermeshing ring gear "$r$") are cut "spiral," giving an end-thrust in one direction while the teeth of spur gears "$G^2$, $G^3$" are cut "helical" with end-thrust of the latter gears opposite to that of the pinions.

Forward of gear "$G^2$" is a one-way clutch "$C^2$" splined to the auxiliary shaft "$S^2$," and adapted to engage a double gear "$G^4$, $G^6$"—carried upon and as part of one and the same intervening sleeve.

Arranged beneath shaft "$S^1$," in suitable bearings, is the usual reversing gear mechanism "$G^7$," with a shifting fork "$C^4$" to connect with "$G^6$." This being a well known adjunct of a transmission system, will require no further explanation.

The operation is as follows: In the position shown in Fig. 1 of the drawing, the clutches $C^1$, $C^3$ being out of engagement with the gear $G^1$, the rotation of the main shaft $S^1$ has no effect upon the other parts.

By shifting the clutches $C^1$ and $C^3$ into engagement with the gear G, the main shaft $S^1$ and its extension $S^3$ are rotatively connected and the power is primarily delivered direct to bevel pinion $p^1$ and ring gear R; but, as pinions $p^1$, $p^2$ are in rotative connection through spur gears $G^3$, $G^2$, the power is divided and in part delivered to pinion $p^2$ and ring gear $r$. The function of gear $G^1$ in such case is merely to connect the shaft $S^1$ and its extension $S^3$ in rotation; but, incidentally, it rotates loosely the double gear $G^4$, $G^6$, sleeved upon the auxiliary shaft $S^2$ as an idler.

A higher speed may be had by clutching-in $C^3$ with the gear $G^1$, leaving clutch $C^1$ disengaged, and engaging clutch $C^2$ with the reduced spur-gear $G^4$. The direct drive is then established from the main shaft $S^1$ through gears $G^1$, $G^4$ to the auxiliary shaft $S^2$ and bevel pinion $P^2$ to ring gear $r$, with incidental delivery laterally through gears $G^2$, $G^3$, and extension-shaft $S^3$ and bevel pinions $P^1$ to ring gear $r$.

A third and lower speed is attained by shifting combined clutch gear $C^3$, $G^5$, forward, causing gear $G^5$ to mesh with gear $G^6$ of the auxiliary shaft $S^2$. Rotation thus imparted is given the companion reduced gear $G^4$, which thus becomes the driver for the larger gear $G^1$; and, by clutching in the clutch $C^1$, rotation is given the extension shaft $S^3$ and its bevel pinion $P^1$, with divided delivery back through gears $G^3$, $G^4$, to pinion $P^2$.

A further connection for reversing is had from gear $G^5$ to gears $G^7$ seated on a suitable stud; but this is common practice.

It will thus be seen that the power is always divided in its application to the ring-gear through both bevel gears, producing a balancing of effect and a division of stresses, tending to prolong the life of parts, besides insuring noiseless and smooth running,—a result due in part to the coördinating effect of the intermeshing gears $G^2$, $G^3$.

The auxiliary shaft is thus not a mere countershaft but an auxiliary drive shaft, in fact as in name.

To recapitulate the individual functions: Gear "$G^5$" which embodies clutch "$C^3$," serves in low gear, intermediate, and for connecting shaft "$S^1$" to "$G^1$" in "direct." Gear "$G^6$" which is on the same sleeve with gear "$G^4$" serves in low and intermediate. Clutch "$C^1$" serves only to connect shaft "$S^3$" with gear "$G^1$" for both "low" and "direct." Clutch "$C^2$" serves to connect shaft "$S^2$" to the combined gears "$G^4$—$G^6$" for intermediate and extra high. The direct drive is all on one side through the main shaft and extension and pinion $P^1$, with incidental coöperating transmissions through gears "$G^3$, $G^2$" to the coöperating pinion "$P^2$."

It will be further observed that in final drive the power is through what may be termed the "terminal" gears always in mesh and close to the point of ultimate application to the ring gear. Also that in transmission but four gears and but three clutch movements are required (except the incidental reverse gear "$G^7$" operated by the usual shifting fork).

With respect to the "drive," embodying the application of power to the ultimate driven gear or "ring" gear of the axle connection, I regard the construction and arrangement shown, as an important feature of my invention and capable of use, with slight mechanical adaptation, to all drives of similar character. The distribution of relative power in opposite rotative directions at opposite sides of the ring gear, practically neutralizes lateral stress; while the use of spiral and helical cut gear-teeth, as indicated, practically neutralizes axial thrust;—thus eliminating frictional resistance to a great extent both upon gears and bearings. This, in connection with the simplification in speed transmission, results in a larger percentage of power actually realized, and longer life of parts concerned, with a corresponding reduction in engine power through greater efficiency in the system throughout.

I claim as my invention—

1. In a transmission gear system, the combination of a main shaft to which power is initially applied; an abutting extension thereof independently rotatable; a normally loose transmission gear journaled in bearings upon the general supporting frame of the system and itself constituting a journal bearing and support for the main and extension shafts in common at their contiguous end portions; and clutches, one at each side of the transmission gear upon the main and extension shafts, adapted to engage said gear in rotation with either or both as desired.

2. In a transmission-gear system of the character indicated, a two-part axle provided with differential mechanism and a rotatable casing; a double-toothed ring-gear secured upon said casing; a main or motor shaft; an independently rotatable extension of said shaft carrying a terminal driving pinion in constant mesh with one set of the ring-gear teeth; an auxiliary shaft in parallel with said main shaft and extension shaft and carrying a terminal driving pinion in constant mesh with the other set of ring gear teeth; intermeshing gears upon said main and auxiliary shafts; and means for transmitting initial driving power through either of said bevel pinions to the ring gear.

3. In a transmission gear of the character indicated a main shaft, an independently rotatable extension thereof, and an auxiliary shaft in parallel with said main and extension shafts; terminal driving pinions carried by the extension and auxiliary shafts and having inclined teeth; a double ring-gear engaged at opposite sides by said pinions and having correspondingly inclined teeth in intermeshing correspondence; and intermeshing spur gears upon the main and auxiliary shafts having oppositely inclined teeth—those of the main shaft gear being inclined oppositely to those of the extension shaft pinion and those of the auxiliary shaft gear being of the same inclination as those of the auxiliary shaft pinion.

4. In a transmission gear system the combination of a main or motor shaft; an abutting independently rotatable extension thereof; an auxiliary shaft in parallel with said main shaft and extension; a transmission gear journaled in bearings upon the supporting frame and embracing the contiguous end portions of the main shaft and extension as a journal bearing for said shafts in common; terminal pinions at the rear extremities of said extension, and auxiliary shafts adapted to engage a corresponding driven element simultaneously; and clutches adapted to engage said transmission gear in rotation with the main shaft or its extension or both, as desired.

5. In a transmission gear-system of the character indicated, a differential ring-gear in connection with the driven axle; an extension and an auxiliary power shaft; a pair of terminal bevel pinions, one upon each of said shafts, in constant mesh with the ring-gear; and a pair of equal intermeshing spur-gears one upon each of said shafts respectively, said pinions and gears being closely contiguous and spaced apart by bearings in common between single elements upon each shaft.

6. A system of gear transmission embodying in combination a main shaft; an abutting and independently rotatable extension of the same; a transmission gear carried in bearings upon the casing and itself carrying concentrically as in a journal-bearing the abutting end portions of said main and extension shafts, said gear being normally loose but connectible with either or both said shafts; an auxiliary shaft in parallel with said main and extension shafts; a rear terminal bevel pinion upon each of said shafts in constant coördinate driving connection with the ring gear; a normally loose double gear with elongated connection sleeve upon the auxiliary shaft and connectible therewith; and a clutch-gear element splined upon the main shaft whereby driving power may be transmitted to the ring gear primarily through the main and extension shafts and the engaging pinion of the latter by the clutch gear element of the main shaft directly to the double gear of the auxiliary shaft and thence to the ring gear by the engaging pinion of the auxiliary shaft.

7. In a system of power transmission of the character indicated, embodying a double ring gear; two shafts in parallel, and terminal pinions thereon in constant mesh with said ring gear, equal permanent spur gears in constant mesh upon said shafts all in permanent rotative relations, the combination of terminal pinions having helically cut teeth with the permanent gears having helically cut teeth; the angular relations being such that the end-thrust of the pinions is absorbed and neutralized by the opposite end-thrust of the said gears.

8. In a transmission gear system, a main shaft having an abutting extension; an auxiliary shaft in parallel therewith; a transmitting spur gear normally loose upon the abutting portions of the main and extension shafts and connectible in rotation with either or both; a second transmitting gear splined upon the main shaft with clutch attached; two spur-gears carried loosely upon the auxiliary shaft upon the extremities of a sleeve connectible with the said shaft; one of said gears being in constant mesh with the first mentioned spur gear of the main and extension shafts, and the other adapted to be engaged as desired in mesh with the second transmission gear of the main shaft.

9. An automotive transmission system for vehicles embodying in combination, a divided axle provided with the standard differential and revolving casing; an integral double-toothed ring gear affixed to the casing; a main and an auxiliary shaft in parallel; terminal driving pinions on said shafts in permanent mesh respectively with said ring gear at opposite sides; a pair of equal spur-gears upon the main and auxiliary shafts in constant mesh; and a plurality of change-speed gears and governing clutches on the said main and auxiliary shafts, arranged and adapted to vary the rotative speed of the ring gear while maintaining always the divided application of power thereto through the driving pinions.

In testimony whereof I have hereunto set my hand in presence of two subscribing witnesses.

WILLIAM FRANKLIN PENROD.

Witnesses:
CARL PHARES,
NORMA D. BERGER.